United States Patent
Chande et al.

(10) Patent No.: US 11,076,421 B2
(45) Date of Patent: Jul. 27, 2021

(54) RANDOM ACCESS CHANNEL (RACH) MESSAGE PARTITIONING FOR BEAM CORRESPONDENCE INDICATION

(71) Applicant: QUALCOMM Incorporated, San Diego, CA (US)

(72) Inventors: Vinay Chande, San Diego, CA (US); Tao Luo, San Diego, CA (US); Xiaoxia Zhang, San Diego, CA (US); Makesh Pravin John Wilson, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/722,485

(22) Filed: Dec. 20, 2019

(65) Prior Publication Data

US 2020/0236704 A1 Jul. 23, 2020

Related U.S. Application Data

(60) Provisional application No. 62/793,771, filed on Jan. 17, 2019.

(51) Int. Cl.
*H04W 74/00* (2009.01)
*H04W 72/04* (2009.01)
(Continued)

(52) U.S. Cl.
CPC ....... *H04W 74/004* (2013.01); *H04W 72/005* (2013.01); *H04W 72/02* (2013.01);
(Continued)

(58) Field of Classification Search
CPC .............. H04W 72/005; H04W 72/02; H04W 72/0413; H04W 72/044; H04W 74/002;
(Continued)

(56) References Cited

U.S. PATENT DOCUMENTS

2018/0049116 A1\* 2/2018 Islam ................... H04W 72/085
2018/0092064 A1\* 3/2018 Ryu ....................... H04L 5/0007
(Continued)

FOREIGN PATENT DOCUMENTS

| WO | 2018084662 A1 | 5/2018 |
| WO | 2018085709 A1 | 5/2018 |
| WO | 2018141111 A1 | 8/2018 |

OTHER PUBLICATIONS

Guangdong Oppo Mobile Telecom: "Discussion on the UL Beam Management," 3GPP Draft, 3GPP TSG RAN WG1 Meeting #89, R1-1707697, 3rd Generation Partnership Project (3GPP), Mobile Competence Centre, 650, Route Des Lucioles, F-06921, Sophia-Antipolis Cedex, France, vol. RAN WG1. No. Hangzhou, May 15, 2017-May 19, 2017, May 14, 2017 (May 14, 2017), XP051272903, 5 pages, Retrieved from the Internet: URL: http://www.3gpp.org/ftp/Meetings_3GPP_SYNC/RAN1/Docs/ [retrieved on May 14, 2017], the whole document.

(Continued)

*Primary Examiner* — Kashif Siddiqui
(74) *Attorney, Agent, or Firm* — Kevin M. Donnelly

(57) ABSTRACT

Various aspects of the present disclosure generally relate to wireless communication. In some aspects, a user equipment (UE) may select, for a first message of a random access channel (RACH) procedure and based at least in part on whether the UE has beam correspondence, at least one of: a set of time-frequency resources for the first message of the RACH procedure, or a preamble for the first message of the RACH procedure. In some aspects, the UE may transmit, to a base station and based at least in part on selecting the at least one of the set of time-frequency resources or the preamble, the first message of the RACH procedure. Numerous other aspects are provided.

16 Claims, 14 Drawing Sheets

(51) Int. Cl.
　　　*H04W 74/08*　　(2009.01)
　　　*H04W 72/02*　　(2009.01)
　　　*H04W 72/00*　　(2009.01)

(52) U.S. Cl.
　　　CPC ..... *H04W 72/044* (2013.01); *H04W 72/0413* (2013.01); *H04W 74/0891* (2013.01)

(58) Field of Classification Search
　　　CPC ........... H04W 74/004; H04W 74/0833; H04W 74/0891
　　　See application file for complete search history.

(56) References Cited

U.S. PATENT DOCUMENTS

| | | | | |
|---|---|---|---|---|
| 2019/0045467 A1* | 2/2019 | Wu | .................... | H04J 11/0076 |
| 2019/0059112 A1* | 2/2019 | Ou | .................... | H04W 74/008 |
| 2019/0110314 A1* | 4/2019 | Abedini | .............. | H04W 74/008 |
| 2019/0327764 A1* | 10/2019 | Yoo | ........................... | H04L 1/18 |
| 2019/0364542 A1* | 11/2019 | Tang | ................... | H04W 72/042 |

OTHER PUBLICATIONS

International Search Report and Written Opinion—PCT/US2019/068317—ISA/EPO—dated Mar. 26, 2020.

Nokia, et al., "Remaining Details on RACH Procedure," 3GPP Draft, 3GPP TSG RAN WG1 Meeting #93, R1-1806923, Remaining Details on RACH Procedure, 3rd Generation Partnership Project (3GPP), Mobile Competence Centre, 650, Route Des Lucioles, F-06921, Sophia-Antipolis Cedex, France, vol. RAN WG1. No. Busan. Korea, May 21, 2018-May 25, 2018, May 20, 2018 (May 20, 2018), XP051442123, 7 pages, Retrieved from the Internet:URL: http://www.3gpp.org/ftp/Meetings%5F3GPP%5FSYNC/RAN1/Docs/ [retrieved on May 20, 2018], the whole document.

* cited by examiner

RANDOM ACCESS CHANNEL (RACH) MESSAGE PARTITIONING FOR BEAM CORRESPONDENCE INDICATION

CROSS-REFERENCE TO RELATED APPLICATION

This application claims priority to U.S. Provisional Patent Application No. 62/793,771, filed on Jan. 17, 2019, entitled "RANDOM ACCESS CHANNEL (RACH) MESSAGE PARTITIONING FOR BEAM CORRESPONDENCE INDICATION," which is hereby expressly incorporated by reference herein.

FIELD OF THE DISCLOSURE

Aspects of the present disclosure generally relate to wireless communication and to techniques and apparatuses for random access channel (RACH) message partitioning for beam correspondence indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power, among other examples). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, an eNodeB, an eNB, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include selecting, for a first message of a random access channel (RACH) procedure based at least in part on whether the UE has beam correspondence, at least one of: a set of time-frequency resources for the first message of the RACH procedure, or a preamble for the first message of the RACH procedure; and transmitting, to a base station (BS), the first message based at least in part on the selected at least one of the set of time-frequency resources or the preamble.

In some aspects, a method of wireless communication, performed by a BS, may include receiving, from a UE, a first message of a RACH procedure, the first message including at least one of: a set of time-frequency resources, or a preamble; and determining, based at least in part on the at least one of the set of time-frequency resources or the preamble, whether the UE has beam correspondence.

In some aspects, a UE for wireless communication may include memory and one or more processors operatively coupled to the memory. The memory and the one or more processors may be configured to select, for a first message of a RACH procedure based at least in part on whether the UE has beam correspondence, at least one of: a set of time-frequency resources for the first message of the RACH procedure, or a preamble for the first message of the RACH procedure; and transmit, to a BS, the first message based at least in part on the selected at least one of the set of time-frequency resources or the preamble.

In some aspects, a BS for wireless communication may include memory and one or more processors operatively coupled to the memory. The memory and the one or more processors may be configured to receive, from a UE, a first message of a RACH procedure, the first message including at least one of: a set of time-frequency resources, or a preamble; and determine, based at least in part on the at least one of the set of time-frequency resources or the preamble, whether the UE has beam correspondence.

In some aspects, a non-transitory computer-readable medium may store one or more instructions that, when executed by one or more processors of a UE, cause the one or more processors to select, for a first message of a RACH procedure based at least in part on whether the UE has beam correspondence, at least one of: a set of time-frequency resources for the first message of the RACH procedure, or a preamble for the first message of the RACH procedure; and transmit, to a BS, the first message based at least in part on the selected at least one of the set of time-frequency resources or the preamble.

In some aspects, a non-transitory computer-readable medium may store one or more instructions that, when executed by one or more processors of a BS, cause the one or more processors to receive, from a UE, a first message of a RACH procedure, the first message including at least one of: a set of time-frequency resources, or a preamble; and determine, based at least in part on the at least one of the set of time-frequency resources or the preamble, whether the UE has beam correspondence.

In some aspects, an apparatus for wireless communication may include means for selecting, for a first message of a RACH procedure based at least in part on whether the apparatus has beam correspondence, at least one of: a set of time-frequency resources for the first message of the RACH procedure, or a preamble for the first message of the RACH procedure; and means for transmitting, to a base station (BS), the first message based at least in part on the selected at least one of the set of time-frequency resources or the preamble.

In some aspects, an apparatus for wireless communication may include means for receiving, from a UE, a first message of a RACH procedure, the first message including at least one of: a set of time-frequency resources, or a preamble; and means for determining, based at least in part on the at least one of the set of time-frequency resources or the preamble, whether the UE has beam correspondence.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

Figure 1:
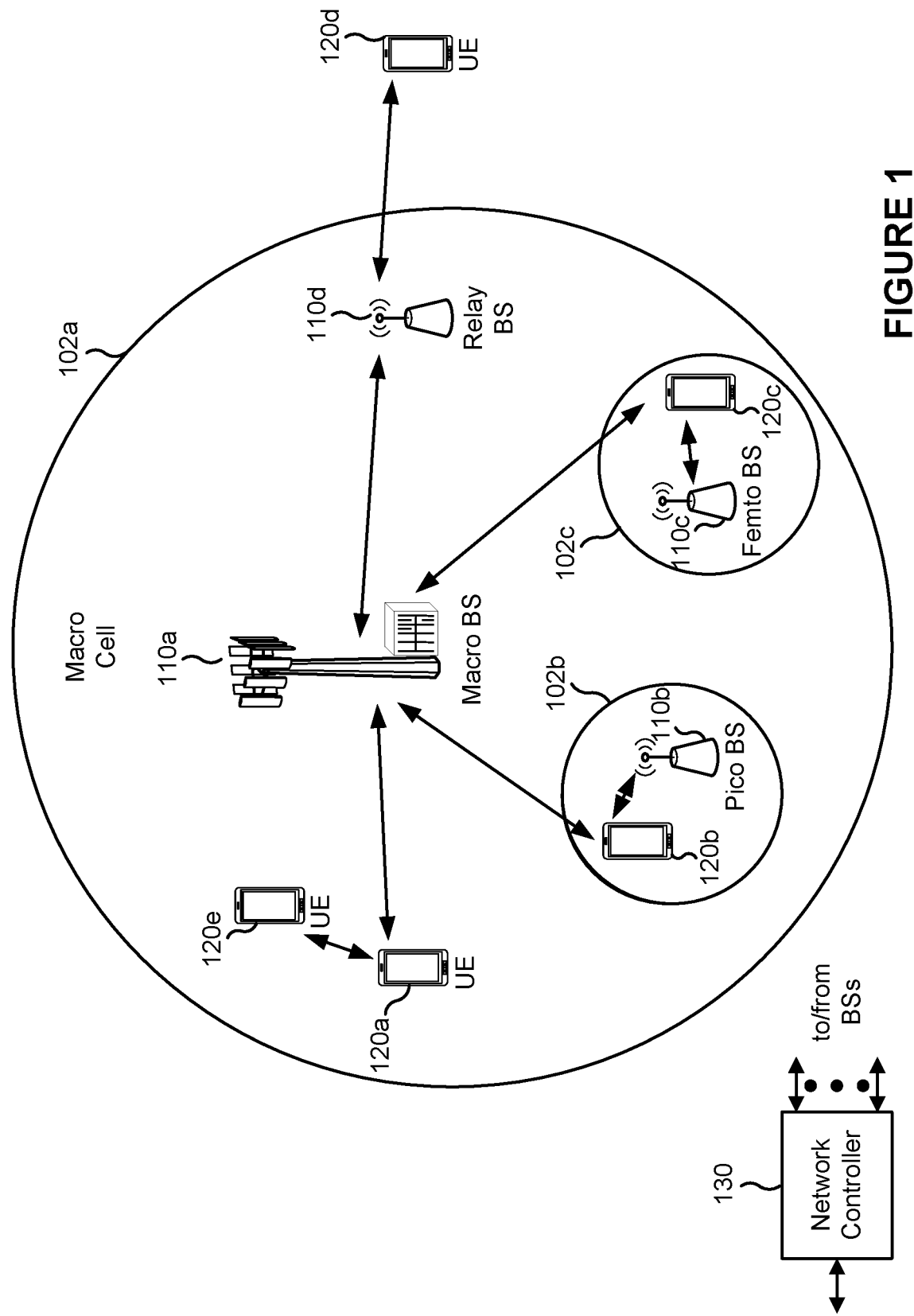
FIG. 1 is a block diagram illustrating an example wireless communication network in accordance with various aspects of the present disclosure.

FIG. 1 is a diagram illustrating an example wireless network in which aspects of the present disclosure may be practiced. The wireless network may be an LTE network or some other wireless network, such as a 5G or NR network. The wireless network may include a number of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, or the like. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not necessarily be stationary, rather, the geographic area of the cell may move according to the location of a mobile BS. In some aspects, the BSs may be interconnected to one another or to one or more other BSs or network nodes (not shown) in the wireless network through various types of backhaul interfaces such as a direct physical connection, a virtual network, or the like using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular radio access technology (RAT) and may operate on one or more frequencies or frequency channels. A frequency may also be referred to as a carrier or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like), a mesh network, or the like. In this case, the UE 120 may perform scheduling operations, resource selection operations, or other operations described elsewhere herein as being performed by the base station 110.

Figure 2:
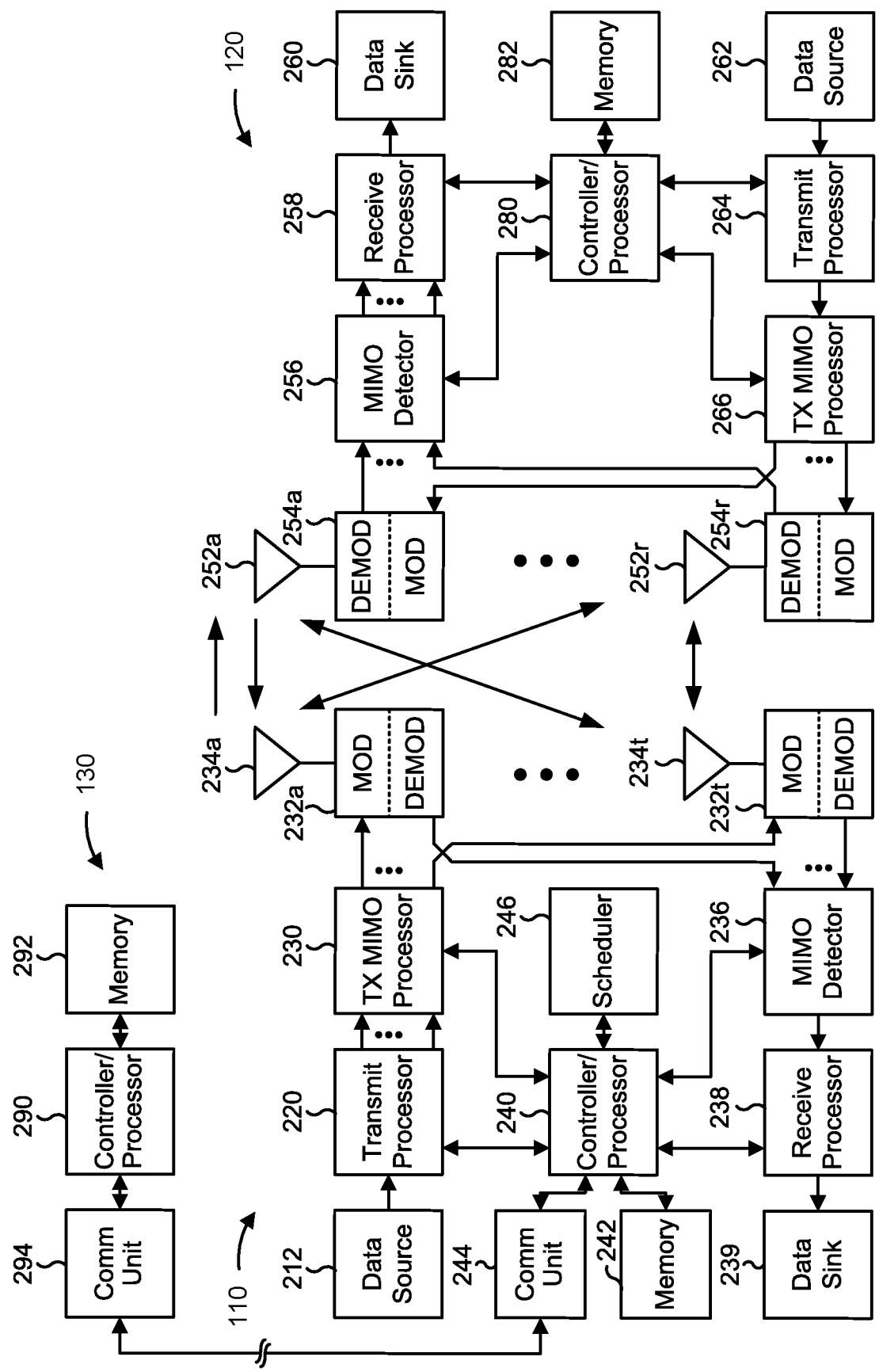
FIG. 2 is a block diagram illustrating an example base station (BS) in communication with user equipment (UE) in a wireless communication network in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like) and control information (for example, CQI requests, grants, upper layer signaling, or the like) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like. In some aspects, one or more components of UE 120 may be included in a housing.

On the uplink, at UE 120, a transmit processor 264 may receive and process data from a data source 262 as well as control information (for example, for reports comprising RSRP, RSSI, RSRQ, CQI, or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with random access channel (RACH) message partitioning for beam correspondence indication, as described in more detail elsewhere herein. For example, controller/processor 240 of base station 110, controller/processor 280 of UE 120, or any other component(s) of FIG. 2 may perform or direct operations of, for example, the process of FIG. 12, the process of FIG. 13, or other processes as described herein. Memories 242 and 282 may store data and program codes for base station 110 and UE 120, respectively. A scheduler 246 may schedule UEs for data transmission on the downlink or uplink.

In some aspects, UE 120 may include means for selecting, for a first message of a RACH procedure based at least in part on whether the UE 120 has beam correspondence, at least one of: a set of time-frequency resources for the first message of the RACH procedure, or a preamble for the first message of the RACH procedure; means for transmitting, to a BS, the first message based at least in part on the selected at least one of the set of time-frequency resources or the preamble; among other examples. In some aspects, such means may include one or more components of UE 120 described in connection with FIG. 2.

In some aspects, base station 110 may include means for receiving, from a UE, a first message of a RACH procedure, the first message including at least one of: a set of time-frequency resources, or a preamble; means for determining, based at least in part on the at least one of the set of time-frequency resources or the preamble, whether the UE has beam correspondence; among other examples. In some aspects, such means may include one or more components of base station 110 described in connection with FIG. 2.

Figure 3A:
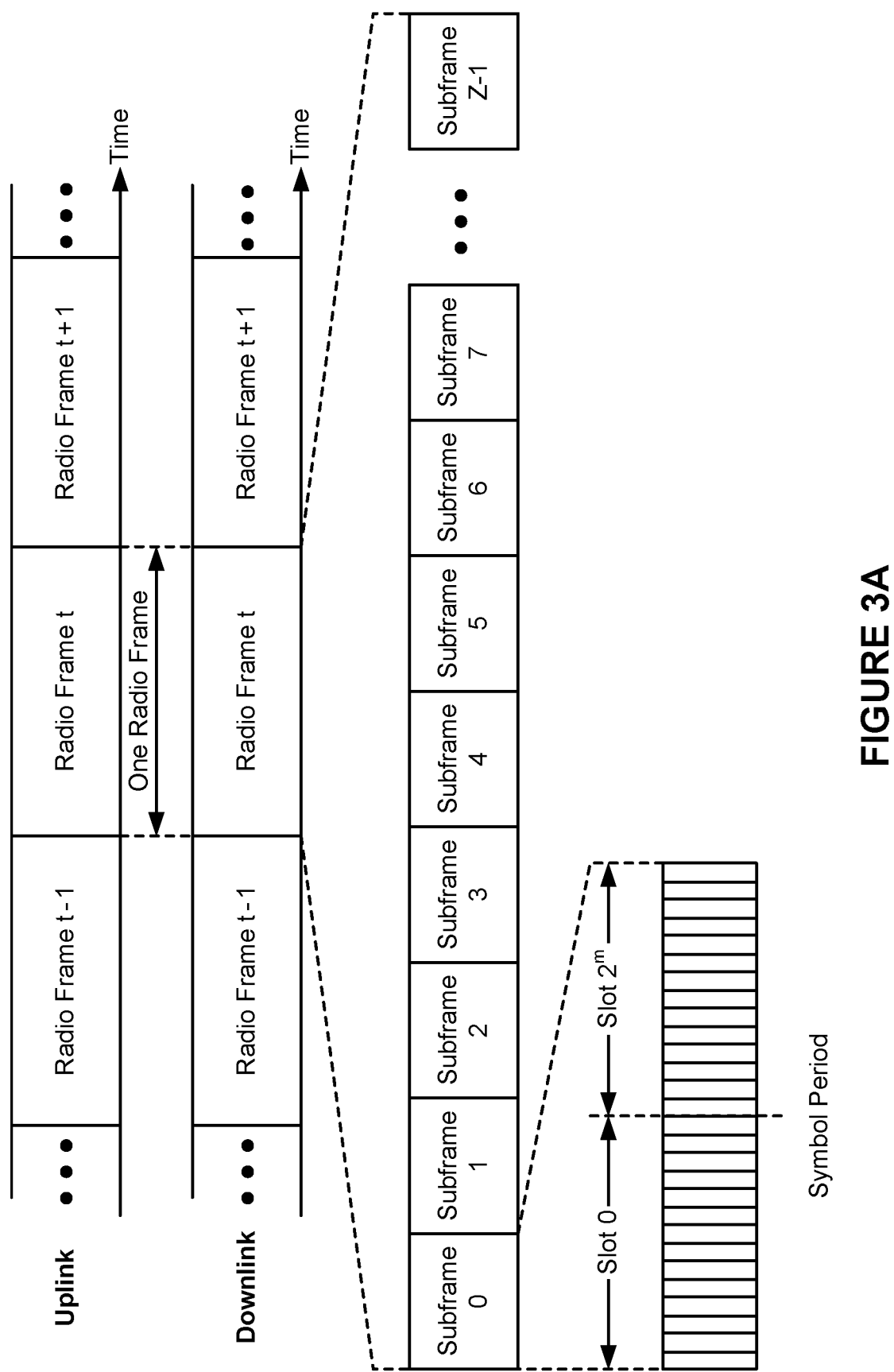
FIG. 3A is a block diagram illustrating an example frame structure for use in a wireless communication network in accordance with various aspects of the present disclosure.

FIG. 3A shows an example frame structure for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is a numerology used for a transmission, such as 0, 1, 2, 3, 4, or the like). Each slot may include a set of L symbol periods. For example, each slot may include fourteen symbol periods (for example, as shown in FIG. 3A), seven symbol periods, or another number of symbol periods.

In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like.

While some techniques are described herein in connection with frames, subframes, slots, or the like, these techniques may equally apply to other types of wireless communication structures, which may be referred to using terms other than "frame," "subframe," "slot," or the like in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In certain telecommunications (for example, NR), a base station may transmit synchronization signals. For example, a base station may transmit a primary synchronization signal (PSS), a secondary synchronization signal (SSS), or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
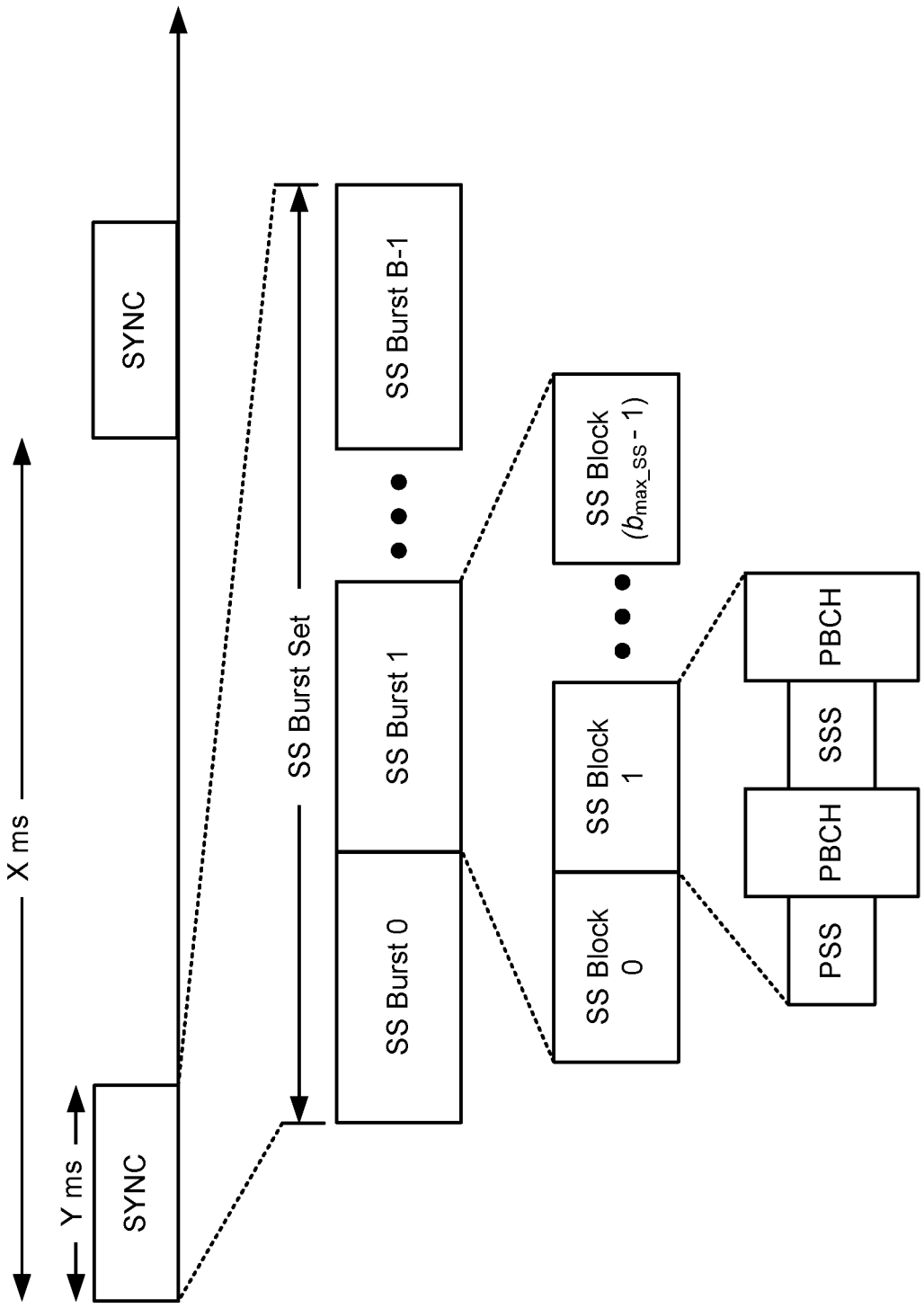
FIG. 3B is a block diagram illustrating an example synchronization communication hierarchy for use in a wireless communication network in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station according to the burst period. In other words, the SS blocks may be repeated during each SS burst. In some aspects, the SS burst set may have a burst set periodicity, and the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data or other data on the PDSCH in the remaining symbol periods of each slot.

Figure 4:
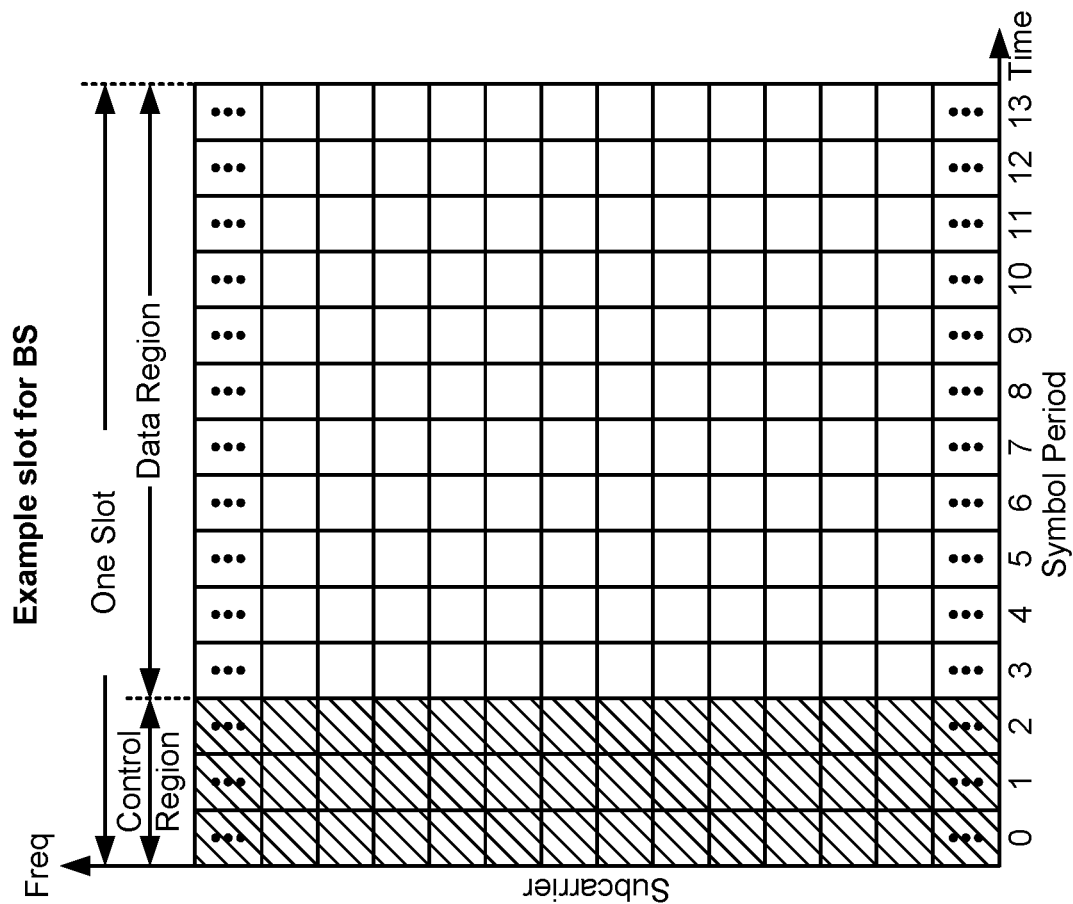
FIG. 4 is a block diagram illustrating an example slot format with a normal cyclic prefix in accordance with various aspects of the present disclosure.

FIG. 4 shows an example slot format 410 with a normal cyclic prefix. The available time frequency resources may be partitioned into resource blocks. Each resource block may cover a set of subcarriers (for example, 12 subcarriers) in one slot and may include a number of resource elements. Each resource element may cover one subcarrier in one symbol period (for example, in time) and may be used to send one modulation symbol, which may be a real or complex value.

An interlace structure may be used for each of the downlink and uplink for FDD in certain telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q−Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, or the like. Received signal quality may be quantified by a signal-to-noise-and-interference ratio (SNR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP- OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

Figure 5:
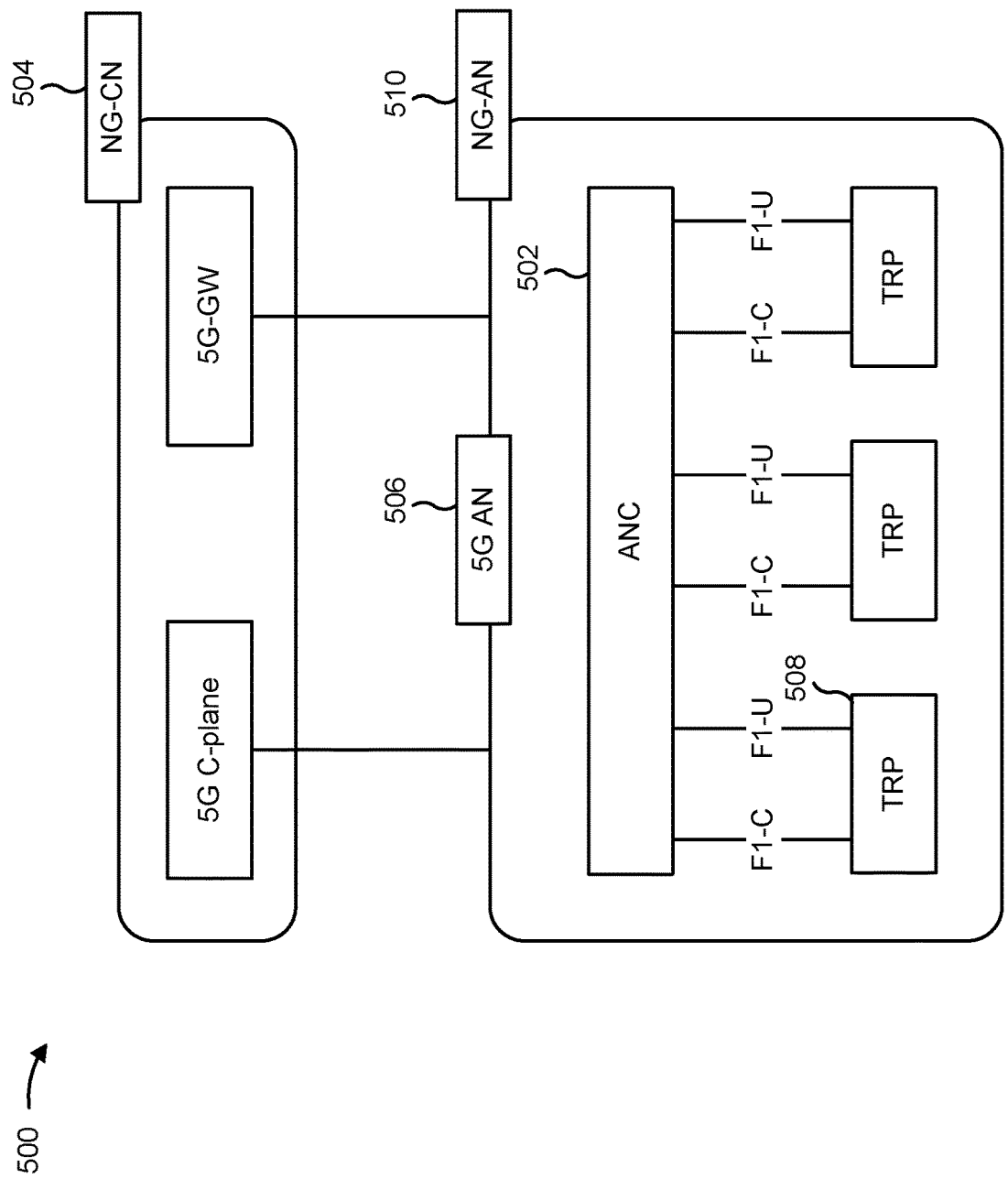
FIG. 5 illustrates an example logical architecture of a distributed radio access network (RAN) in accordance with various aspects of the present disclosure.

FIG. 5 illustrates an example logical architecture of a distributed radio access network (RAN) 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used for fronthaul definition. The architecture may be defined to support fronthauling solutions across different deployment types. For example, the architecture may be based at least in part on transmit network capabilities (for example, bandwidth, latency, or jitter). The architecture may share features or components with LTE. According to aspects, the next generation AN (NG-AN) 510 may support dual connectivity with NR. The NG-AN may share a common fronthaul for LTE and NR. The architecture may enable cooperation between and among TRPs 508. For example, cooperation may be preset within a TRP or across TRPs via the ANC 502. According to aspects, no inter-TRP interface may be needed/present. According to aspects, a dynamic configuration of split logical functions may be present within the architecture of RAN 500. The packet data convergence protocol (PDCP), radio link control (RLC), and MAC protocol layers may be adaptably placed at the ANC or TRP. According to various aspects, a BS may include a central unit (CU) (for example, ANC 502) or one or more distributed units (for example, one or more TRPs 508).

Figure 6:
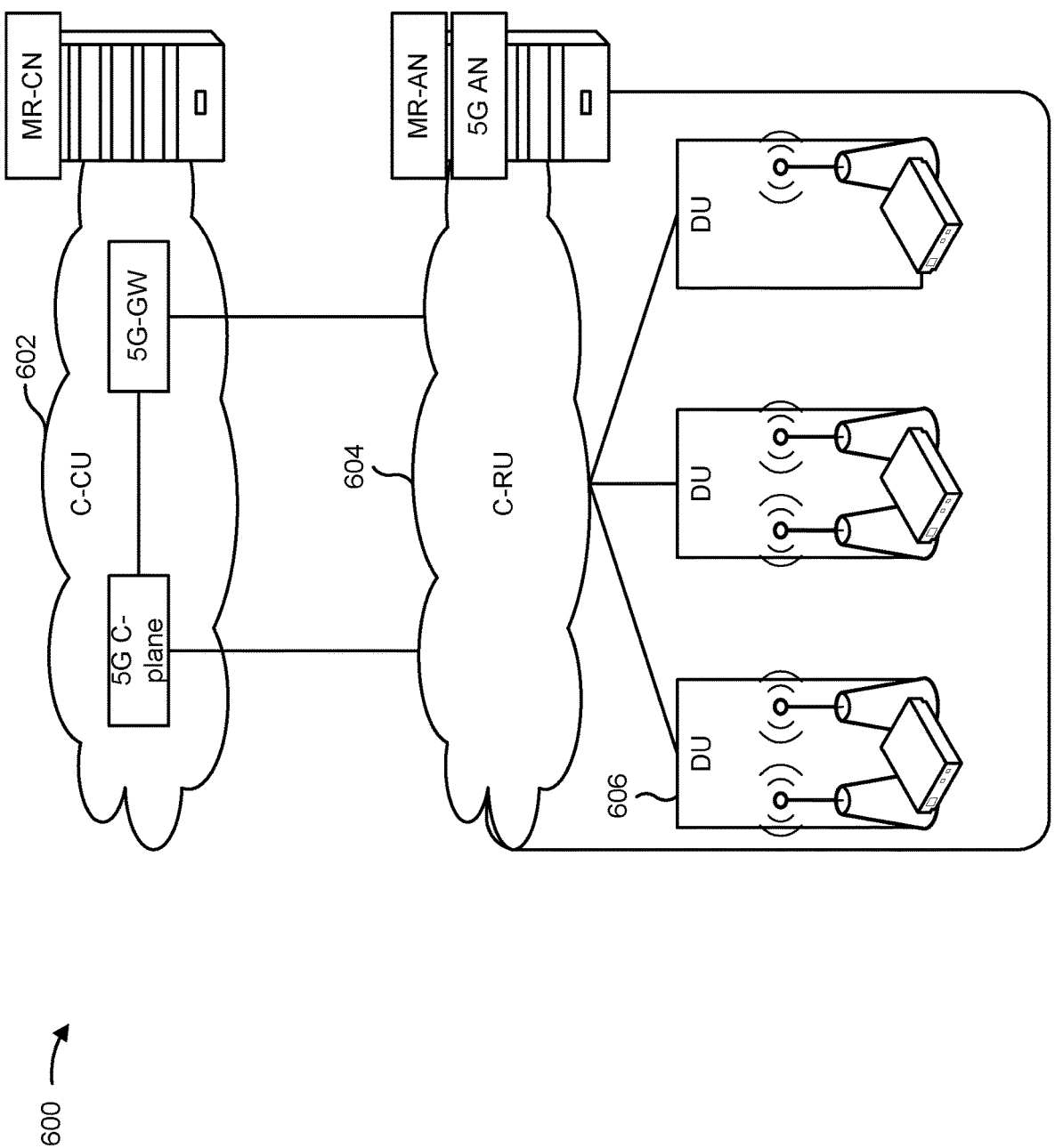
FIG. 6 illustrates an example physical architecture of a distributed RAN in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

Figure 7:
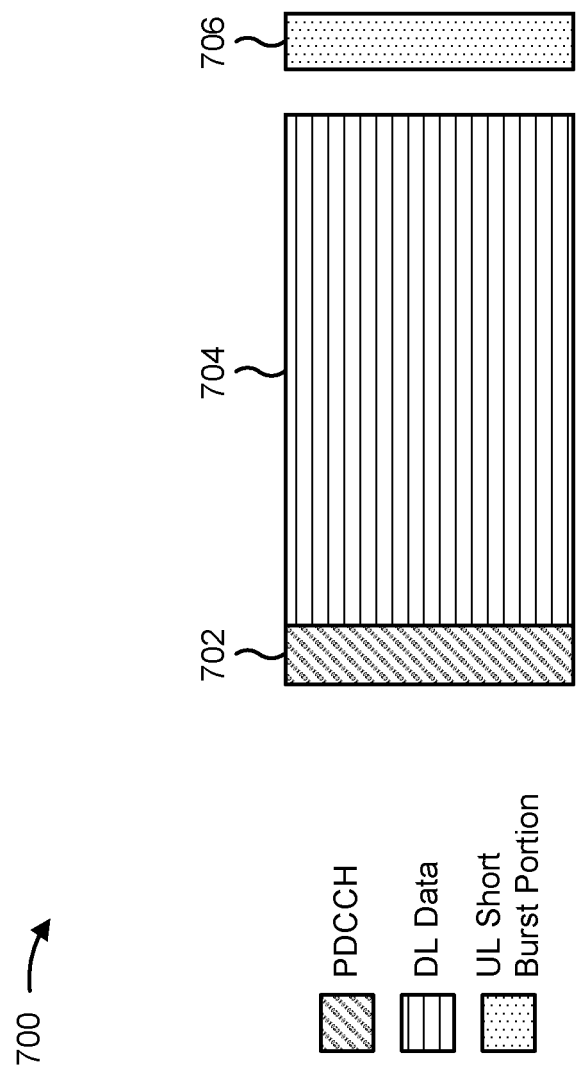
FIG. 7 is a diagram illustrating an example downlink (DL)-centric slot, in accordance with various aspects of the present disclosure.

FIG. 7 is a diagram showing an example wireless communication structure for a DL-centric slot 700. The DL-centric slot may include a control portion 702 during which the scheduling entity (for example, UE or BS) transmits various scheduling information or control information corresponding to various portions of the DL-centric slot to the subordinate entity (for example, UE). The control portion 702 may exist in the initial or beginning portion of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (for example, carried on a physical control format indicator channel (PCFICH)), one or more grants (for example, downlink grants, uplink grants, or the like), or the like.

The DL-centric slot may also include a DL data portion 704 during which the scheduling entity (for example, UE or BS) transmits DL data to the subordinate entity (for example, UE) using communication resources utilized to communicate DL data. The DL data portion 704 may sometimes be referred to as the payload of the DL-centric slot. In some configurations, the DL data portion 704 may be a physical DL shared channel (PDSCH).

The DL-centric slot may also include an UL short burst portion 706 during which the subordinate entity (for example, UE) transmits reference signals or feedback to the scheduling entity (for example, UE or BS) using communication resources utilized to communicate UL data. The UL short burst portion 706 may sometimes be referred to as an UL burst, an UL burst portion, a common UL burst, a short burst, an UL short burst, a common UL short burst, a common UL short burst portion, or various other suitable terms. In some aspects, the UL short burst portion 706 may include one or more reference signals. Additionally or alternatively, the UL short burst portion 706 may include feedback information corresponding to various other portions of the DL-centric slot. For example, the UL short burst portion 706 may include feedback information corresponding to the control portion 702 or the data portion 704.

Non-limiting examples of information that may be included in the UL short burst portion 706 include an ACK signal (for example, a PUCCH ACK, a PUSCH ACK, or an immediate ACK), a NACK signal (for example, a PUCCH NACK, a PUSCH NACK, or an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without necessarily deviating from the aspects described herein.

Figure 8:
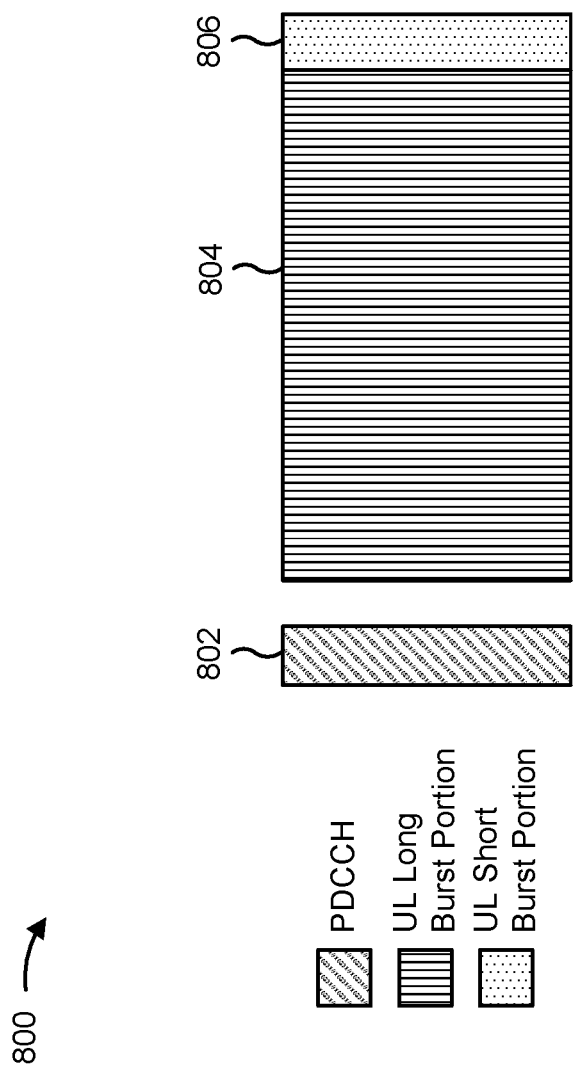
FIG. 8 is a diagram illustrating an example uplink (UL)-centric slot in accordance with various aspects of the present disclosure.

FIG. 8 is a diagram showing an example wireless communication structure for an UL-centric slot 800. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (for example, UE) to the scheduling entity (for example, UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (for example, UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, or various other suitable applications. Generally, a sidelink signal may refer to a signal communicated from one subordinate entity (for example, UE1) to another subordinate entity (for example, UE2) without relaying that communication through the scheduling entity (for example, UE or BS), even though the scheduling entity may be utilized for scheduling or control purposes. In some aspects, the sidelink signals may be communicated using a licensed spectrum band; in other aspects, the sidelink signals may be communicated using an unlicensed spectrum band.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In NR, a network may use a RACH procedure in association with various operations. For example, a UE and a BS may use the RACH procedure in association with initial access, handover, system information request, or beam failure recovery. The first message transmitted in a 4-step RACH procedure is referred to as msg1. The first message transmitted in a 2-step RACH procedure is referred to as msgA. The UE 120 transmits the first message (msg1 or msgA) to the base station. The first message is identified by a combination of a RACH occasion for the first message (for example, time-frequency resources used for the first message) and a physical RACH (PRACH) preamble of the first message. Upon receiving the first message, the BS detects the PRACH associated with the first message, identifies the RACH occasion associated with the first message (for example, to determine a random access radio network temporary identifier (RA-RNTI)), and identifies a preamble index of the PRACH preamble to determine a random access preamble identifier (RAPID).

A UE selects the combination of RACH occasion and PRACH preamble from a configured set or sets of time-frequency resources and PRACH preambles, respectively. For example, and for initial access, the selected set is configured via remaining minimum system information (RMSI) from a BS as a mapping between synchronization signal and PBCH block (SSB) indexes and PRACH preambles. Additionally or alternatively, as another example, the UE may be configured with a combination of PRACH preamble and RACH occasion, in association with a reference signal (RS) (for example, an SSB RS or a channel state information reference signal (CSI-RS)), based at least in part on a PDCCH order from a BS, for contention-free random access while the UE is in a connected mode.

UE beam correspondence refers to using a beam, that was previously used for an uplink transmission, for a downlink transmission, and vice versa. Beam correspondence holds at the UE (for example, the UE has beam correspondence) if a set of conditions is satisfied. For example, the UE has beam correspondence if the UE is able to determine a TX beam for an uplink transmission to be transmitted to the BS based on the UE's downlink measurement of a receive (RX) beam received from the BS. Similarly, as another example, the UE has beam correspondence if the UE is able to determine a UE RX beam for a downlink reception from the BS based on an indication from the BS that is based on an uplink measurement by the BS of a TX beam transmitted by the UE.

As another example, an uplink beam (used for transmission at the UE and reception at the BS) and a downlink beam (used for transmission at the BS and reception at the UE) may have beam correspondence if the uplink beam and the downlink beam are in the same direction or path (for example, with energy radiating in a particular direction or path more than other directions or paths), except that communications on the uplink beam propagate in the opposite direction as communications on the downlink beam. Further, electrical characteristics of an antenna used to transmit and receive communications via a beam pair having beam correspondence, such as gain, radiation pattern, impedance, bandwidth, resonant frequency, or polarization, among other examples, may be the same, regardless of whether the antenna is transmitting or receiving, due to the reciprocity theorem of electromagnetics. As used herein, a beam pair that has beam correspondence may also be referred to as a reciprocal beam pair. Similarly, a beam pair that does not have beam correspondence may also be referred to as a non-reciprocal beam pair.

Information regarding whether the UE has beam correspondence may be useful to a BS. For example, the BS may use the information to infer an appropriate downlink precoding based on uplink reception of an SRS from the UE. Currently, providing, to the BS, information regarding whether the UE has beam correspondence requires dedicated communications for the purpose of informing the BS of whether the UE has beam correspondence, thereby introducing latency into the process of informing the BS of whether the UE has beam correspondence or consuming network resources (for example, bandwidth). In addition, this latency may result in the UE and the BS operating as though the UE does not have beam correspondence (for example, the BS and the UE may perform beam management procedures), thereby introducing latency or consuming processing resources of the UE and the BS in situations when measurement or selection of a new beam would not be needed.

Some techniques and apparatuses described herein provide for a RACH procedure that includes RACH message partitioning for indicating beam correspondence. For example, the UE may make selections of a RACH occasion or a PRACH preamble for a first transmission of a RACH procedure. The UE's selections indicate to the BS whether the UE has beam correspondence. In this way, the UE can indicate to the BS whether the UE has beam correspondence without having to use additional messages to provide this information to the BS. This technique conserves processing resources of the UE and the BS that would otherwise be consumed as a result of sending and receiving the additional messages. In addition, reducing or eliminating the additional messages conserves network resources that would otherwise be consumed by the additional messages. Further, communicating this information in association with a first message of a RACH procedure reduces or eliminates latency with regard to informing the BS of whether the UE has beam correspondence, conserves processing resources that would otherwise be consumed performing a beam management procedure in instances in which the UE has beam correspondence, or the like.

Figure 9:
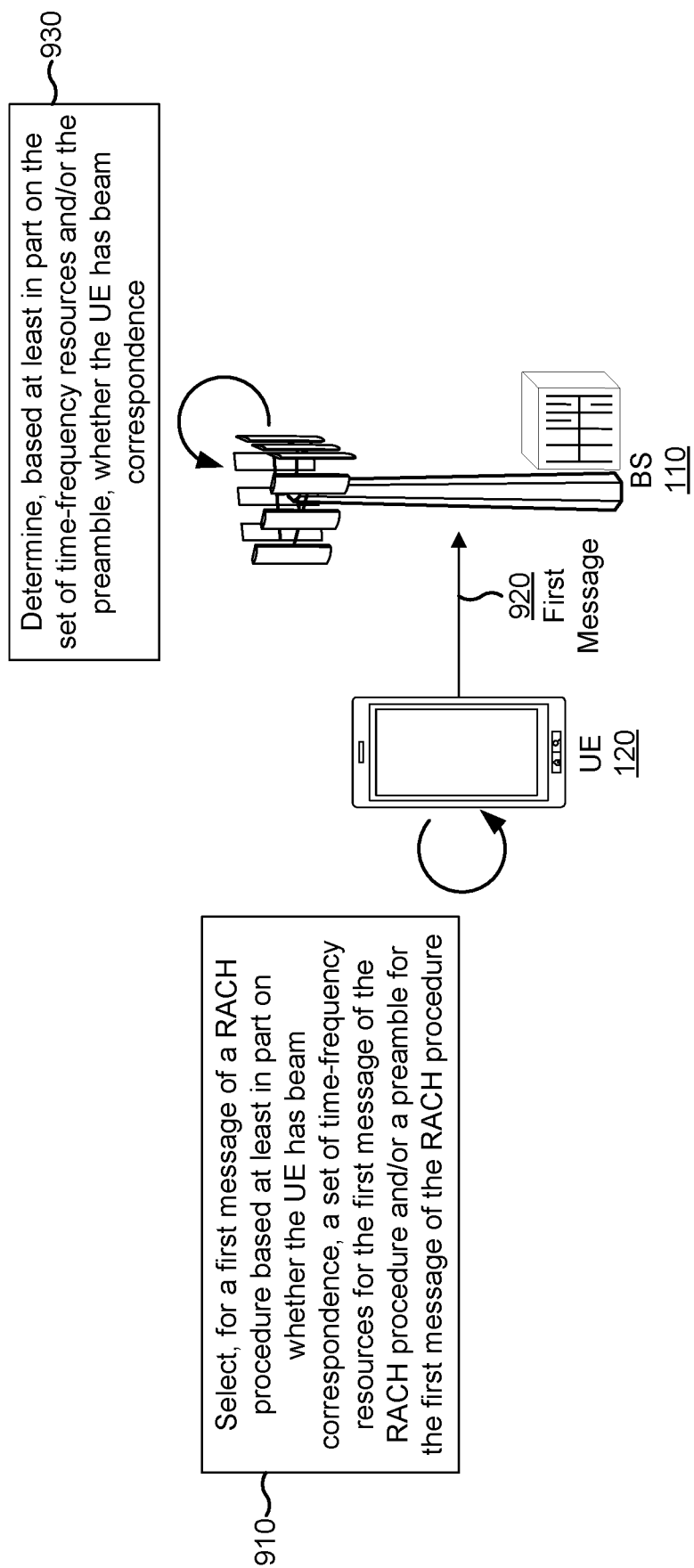
FIG. 9 is a diagram illustrating an example of RACH message partitioning for beam correspondence indication in accordance with various aspects of the present disclosure.

FIG. 9 is a diagram illustrating example operations for RACH message partitioning for indicating beam correspondence in accordance with various aspects of the present disclosure. As shown in FIG. 9, the example operations are performed by a UE (for example, UE 120) and a BS (for example, BS 110). In a first operation 910, the UE may select, for a first message of a RACH procedure based at least in part on whether the UE has beam correspondence, at least one of: a set of time-frequency resources for the first message of the RACH procedure or a preamble for the first message of the RACH procedure. For example, the UE may select a set of time-frequency resources (for example, that includes time resources and frequency resources), a preamble (for example, a PRACH preamble), or a combination of a set of time-frequency resources and a preamble for a first message of a RACH procedure.

In some aspects, the set of time-frequency resources or the preamble selected for the first message may indicate whether the UE has beam correspondence. For example, the UE may select one or more time-frequency resources from a first set of time-frequency resources to indicate that the UE has beam correspondence, or may select one or more time-frequency resources from a second set of time-frequency resources to indicate that the UE does not have beam correspondence. Additionally or alternatively, as another example, the UE may select a preamble for the first message from a first set of preambles to indicate that the UE has beam correspondence, or may select a preamble for the first message from a second set of preambles to indicate that the UE does not have beam correspondence.

In some aspects, the UE may select the set of time-frequency resources or the preamble based at least in part on an SSB index of an SSB received from the BS. For example, the UE may select the set of time-frequency resources (depending on whether the UE has beam correspondence) from a super set of time-frequency resources associated with the SSB index or may select the preamble from a set of preambles associated with the SSB index. In some aspects, the UE may determine to select a set of time-frequency resources, a set of preambles, or a combination of the set of time-frequency resources and the preamble based on the SSB index. For example, the UE may determine to select the set of time-frequency resources to indicate whether the UE has beam correspondence based on a first SSB index, may determine to select the preamble to indicate whether the UE has beam correspondence based on a second SSB index, or may determine to select a combination of the set of time-frequency resources and the preamble to indicated whether the UE has beam correspondence based on a third SSB index.

In some aspects, the UE may select the set of time-frequency resources or the preamble based at least in part on preconfigured information stored by the UE. For example, the preconfigured information may include a mapping that identifies a super set of time-frequency resources from which the UE is to select the set of time-frequency resources when the UE has beam correspondence, a super set of time-frequency resources from which to select the set of time-frequency resources when the UE does not have beam correspondence, a set of preambles from which the UE is to select the preamble when the UE has beam correspondence, or a set of preambles from which the UE is to select the preamble when the UE does not have beam correspondence.

In some aspects, the UE may select the set of time-frequency resources or the preamble based at least in part on RMSI. For example, the UE may receive RMSI from a BS that includes information identifying a super set of time-frequency resources from which the UE is to select the set of time-frequency resources, a set of preambles from which the UE is to select the preamble, or the like. Continuing with the previous example, the UE may select, depending on whether the UE has beam correspondence, the time-frequency resources or the preamble based on the information included in the RMSI.

In some aspects, the UE may select the set of time-frequency resources or the preamble based at least in part on a PDCCH, such as a PDCCH order (for example, for contention-free random access when the UE is in a connected mode). For example, a UE may receive a PDCCH order from a BS that includes information identifying a super set of time-frequency resources from which the UE is to select the set of time-frequency resources, a set of preambles from which the UE is to select the preamble, or the like. Continuing with the previous example, the UE may select, depending on whether the UE has beam correspondence, the time-frequency resources or the preamble based on the information included in the PDCCH order.

In some aspects, the UE may select the set of time-frequency resources or the preamble based at least in part on a media access control (MAC) control element (MAC CE) received from the BS. For example, a UE may receive, from a BS, a MAC CE that includes information identifying a super set of time-frequency resources from which the UE is to select the set of time-frequency resources, a set of preambles from which the UE is to select the preamble, or the like. Continuing with the previous example, the UE may select, depending on whether the UE has beam correspondence, the time-frequency resources or the preamble based on the information included in the MAC CE.

In some aspects, the UE may determine whether the UE has beam correspondence prior to selecting the set of time-frequency resources or the preamble. For example, the UE may determine that the UE has beam correspondence based at least in part on the UE being able to determine a TX beam to be transmitted to a BS based on the UE's downlink measurement of one or more RX beams received from the BS. As another example, the UE may determine that it has beam correspondence based at least in part on the UE being able to determine an RX beam received from a BS based on an indication from the BS, the indication being based on an uplink measurement by the BS of one or more TX beams transmitted by the UE. Continuing with the previous example, the UE may determine that the UE does not have beam correspondence if the UE is not able to determine a TX beam based on the UE's downlink measurement on one or more RX beams, is not able to determine an RX beam based on a BS's indication based on an uplink measurement of one or more TX beams of the UE, or the like.

In a second operation 920, the UE may transmit, and the BS may receive, the first message of the RACH procedure. For example, the UE may transmit the first message (for example, msg1 or msgA of a RACH procedure) to the BS based at least in part on selecting the set of time-frequency resources or the preamble (for example, after selecting the set of time-frequency resources or the preamble).

In some aspects, the UE may transmit the first message on a RACH occasion. For example, the RACH occasion may include a set of time-frequency resources on which the first message is transmitted to the BS. Continuing with the previous example, the set of time-frequency resources on which the first message is transmitted may indicate whether the UE has beam correspondence, as described elsewhere herein.

In a third operation 930, the BS may determine, based at least in part on the set of time-frequency resources or the preamble, whether the UE has beam correspondence. For example, based at least in part on receiving the first message, the BS may process the set of time-frequency resources on which the first message was received or the preamble of the first message to determine whether the UE has beam correspondence. Continuing with the previous example, the BS may determine whether the UE has beam correspondence based at least in part on a set of time-frequency resources used for the first message, a preamble of the first message, or the like.

In some implementations, the BS may use information that identifies an SSB index of an SSB transmitted to the UE to determine whether the UE has beam correspondence. Additionally or alternatively, the BS may use preconfigured information stored by the BS that includes a mapping of time-frequency resources or preambles from which the UE was expected to select the set of time-frequency resources or the preamble depending on whether the UE has beam correspondence to determine whether the UE has beam correspondence. Additionally or alternatively, the BS may use information included in an RMSI transmitted to the UE to determine whether the UE has beam correspondence. Additionally or alternatively, the BS may use information included in a PDCCH order transmitted to the UE to determine whether the UE has beam correspondence. Additionally or alternatively, the BS may use information included in a MAC CE transmitted to the UE to determine whether the UE has beam correspondence. For example, the BS may use the SSB index, the preconfigured information, the information included in the RMSI, the information included in the PDCCH order, the information included in the MAC CE, or the like, to determine whether the UE has beam correspondence based at least in part on the set of time-frequency resources or the preamble used for the first message. Continuing with the previous example, from these types of information, the BS may be capable of determining a possible set of time-frequency resources or a possible set of preambles from which the UE could have selected the set of time-frequency resources or the preamble to indicate whether the UE has the beam correspondence, and may compare the set of time-frequency resources or the preamble actually selected for the first message to these possible sets to determine whether the UE has beam correspondence.

In some aspects, the BS may determine, based at least in part on determining whether the UE has beam correspondence, a beam which the UE is expected to use for an uplink transmission, a beam to use for a downlink transmission, or the like. For example, if the BS determines that the UE has beam correspondence, then the BS may determine a beam which the UE is expected to use for an uplink transmission based on a previously performed measurement of a beam used for a previously performed downlink transmission. Similarly, if the BS determines that the UE has beam correspondence, then the BS may determine a beam to use for a downlink transmission based on a previously performed measurement of a beam used for a previously performed uplink transmission, or the like.

In some aspects, if the BS determines that the UE does not have beam correspondence, the BS may perform beam management procedures (for example, may transmit an RS, may cause the UE to transmit an RS, may perform a measurement of an RS, may select a beam based on a measurement of an RS, or the like). In some aspects, the UE may perform beam management procedures in association with the BS performing the beam management procedures (for example, may transmit an RS, may perform a measurement of an RS from the BS, may select a beam to use for a transmission or a reception based on a measurement, or the like).

In some aspects, the BS may determine, from the first message, an RA-RNTI, a RAPID, or the like (for example, in association with determining whether the UE has beam correspondence). For example, the BS may determine the RA-RNTI, the RAPID, or the like based at least in part on the set of time-frequency resources selected for the first message, based at least in part on the preamble selected for the first message, or the like. In some aspects, the BS may transmit a second message of the RACH procedure to the UE (for example, msg2 or msgB of a RACH procedure). In some aspects, the BS or the UE may perform one or more other procedures associated with a RACH procedure, such as the BS receiving a third message of the RACH procedure (for example, msg3) from the UE, the BS transmitting a fourth message (for example, msg4) of the RACH procedure to the UE, or the like.

As indicated above, FIG. 9 is provided as an example. Other examples may differ from what is described with respect to FIG. 9. Although some implementations are described in the context of selecting time-frequency resources, the UE may select only time resources or only frequency resources.

Figure 10:
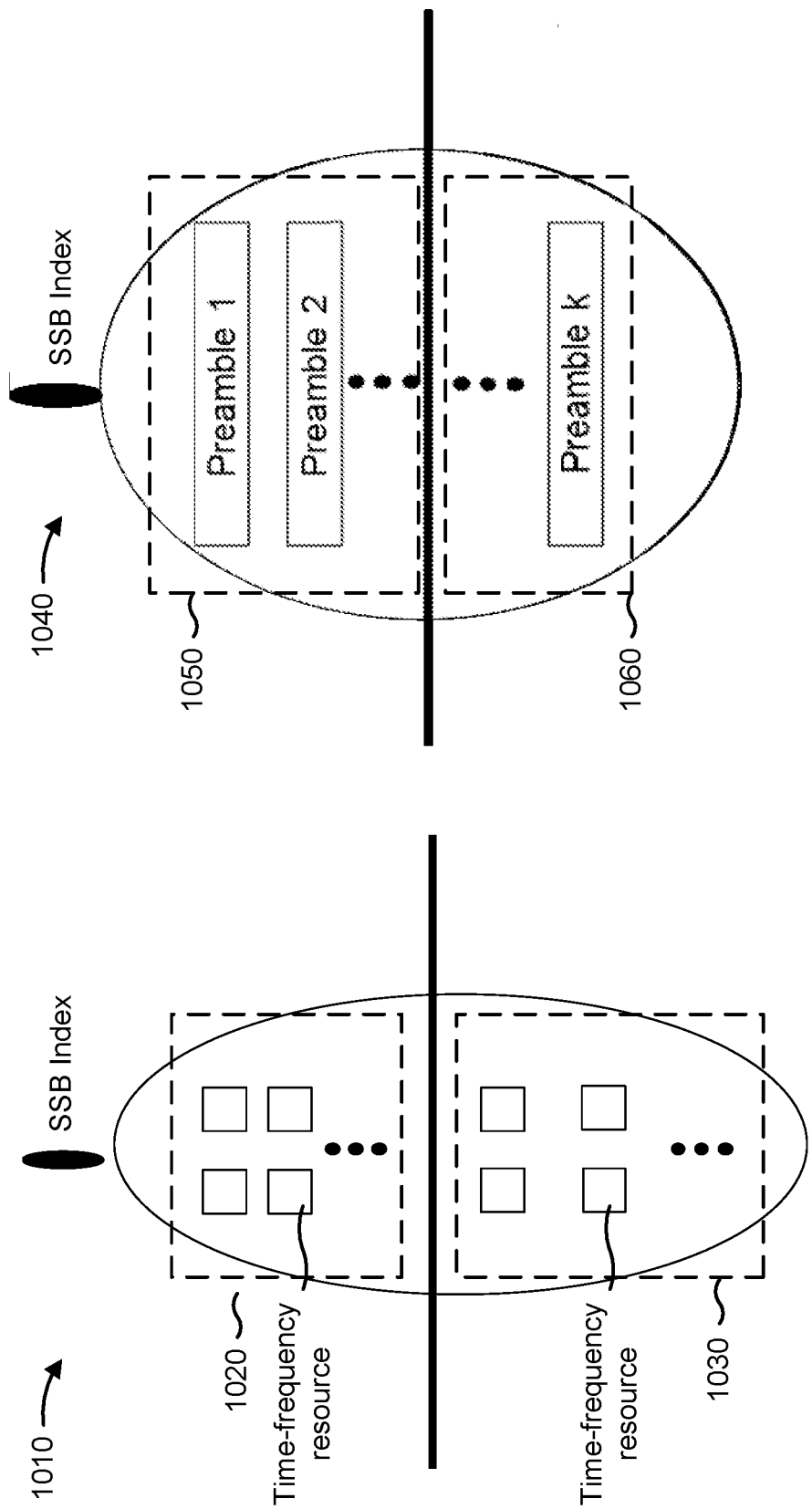
FIG. 10 is a diagram illustrating an example of RACH message partitioning for beam correspondence indication in accordance with various aspects of the present disclosure.

FIG. 10 is a diagram illustrating an example of RACH message partitioning for beam correspondence indication, in accordance with various aspects of the present disclosure. FIG. 10 shows an example of the partitioning of time-frequency resources or preambles to be used for a first message of a RACH procedure.

In an operation 1010, time-frequency resources may be used by a UE for a first message of a RACH procedure (for example, based at least in part on an SSB index). A first set of time-frequency resources 1020 may be used when the UE has beam correspondence. For example, if the UE has beam correspondence, the UE may select one or more of the first set of time-frequency resources 1020 to use for transmitting the first message to the BS to indicate to the BS that the UE has beam correspondence. A second set of time-frequency resources 1030 may be used when the UE does not have beam correspondence. For example, if the UE does not have beam correspondence, the UE may select one or more of the second set of time-frequency resources 1030 to use for the first message to indicate to the BS that the UE does not have beam correspondence.

In an operation 1040, preambles may be used by a UE for a first message of a RACH procedure (for example, based at least in part on an SSB index). A first set of preambles 1050 may be used when the UE has beam correspondence. For example, if the UE has beam correspondence, the UE may select a preamble from the first set of preambles 1050 to use for transmitting the first message to the BS to indicate to the BS that the UE has beam correspondence. A second set of preambles 1060 may be used when the UE does not have beam correspondence. For example, if the UE does not have beam correspondence, the UE may select a preamble from the second set of preambles 1060 to use for the first message to indicate to the BS that the UE does not have beam correspondence.

In some aspects, and as described elsewhere herein, the UE may select time-frequency resources, a preamble, or a combination of time-frequency resources or preambles to indicate whether the UE has beam correspondence. In some aspects, although a single SSB index is shown with respect to the various sets of time-frequency resources and preambles, there may be multiple SSB indexes, each associated with respective sets of time-frequency resources and preambles. In addition, although an SSB index is provided as an example, the sets of time-frequency resources and the sets of preambles described with reference to FIG. 10 may be associated with a PDCCH order, an RMSI, or the like as described elsewhere herein.

As indicated above, FIG. 10 is provided as an example. Other examples may differ from what is described with respect to FIG. 10.

Figure 11:
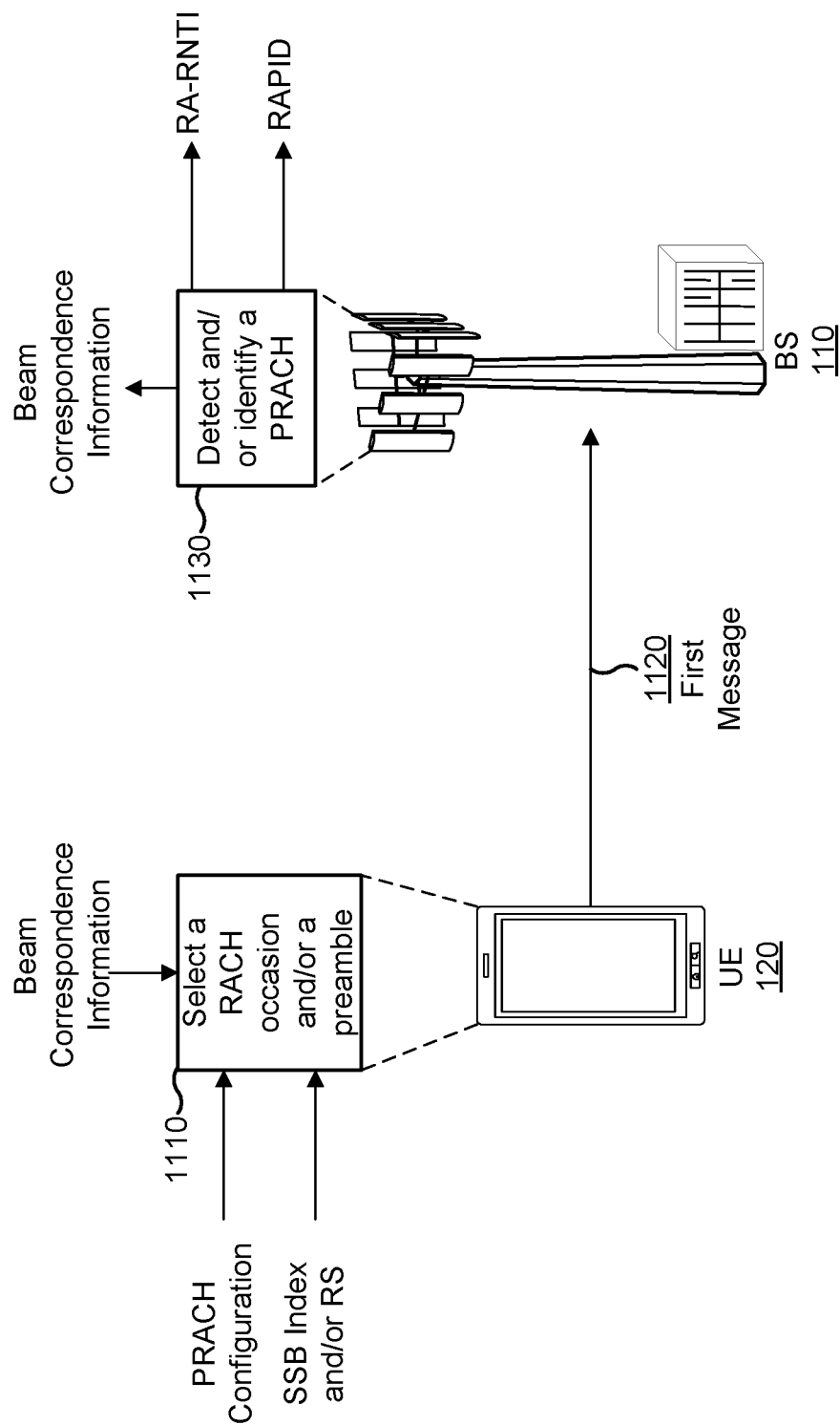
FIG. 11 is a diagram illustrating an example of RACH message partitioning for beam correspondence indication in accordance with various aspects of the present disclosure.

FIG. 11 is a diagram illustrating an example of RACH message partitioning for beam correspondence indication, in accordance with various aspects of the present disclosure. FIG. 11 shows an example of operations of a UE and a BS with regard to a first message of a RACH process described herein.

In a first operation 1110, the UE may select a RACH occasion or a preamble for a first message of a RACH procedure. For example, the UE may select the RACH occasion or the preamble for the first message to indicate whether the UE has beam correspondence, in a manner similar to that described elsewhere herein. In some aspects, and as shown, the UE may select the RACH occasion or the preamble based at least in part on a PRACH configuration received from the BS, an SSB index received from the BS, an RS received from the BS, or beam correspondence information that indicates whether the UE has beam correspondence.

In a second operation 1120, the UE may transmit the first message to the BS. For example, the UE may transmit the first message after selecting the RACH occasion or the preamble for the first message, in a manner similar to that described elsewhere herein.

In a third operation 1130, the BS may detect or identify a PRACH. For example, the BS may detect or identify the PRACH based at least in part on receiving the first message from the UE. Continuing with the previous example, the BS may process the set of time-frequency resources or the preamble of the first message to determine beam correspondence information that identifies whether the UE has beam correspondence, to determine an RA-RNTI, to determine a RAPID, or the like.

As indicated above, FIG. 11 is provided as an example. Other examples may differ from what is described with respect to FIG. 11.

Figure 12:
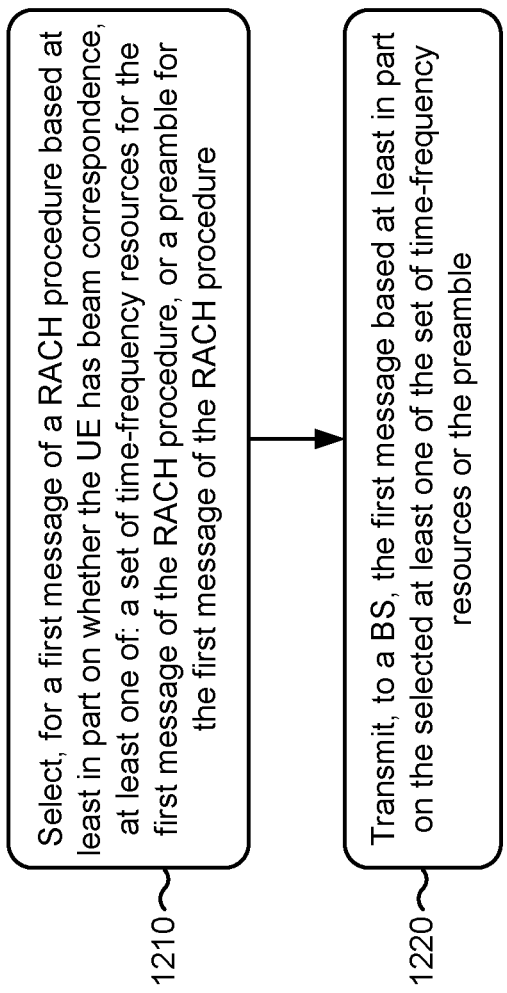
FIG. 12 is a diagram illustrating an example process performed by a UE in accordance with various aspects of the present disclosure.

FIG. 12 is a diagram illustrating an example process performed, for example, by a UE, in accordance with various aspects of the present disclosure. The process is an example where a UE (for example, UE 120) performs RACH message partitioning for beam correspondence indication.

As shown in FIG. 12, in some aspects, the process may include selecting, for a first message of a RACH procedure based at least in part on whether the UE has beam correspondence, at least one of: a set of time-frequency resources for the first message of the RACH procedure, or a preamble for the first message of the RACH procedure (block 1210). For example, the UE (for example, using controller/processor 280, or the like) may select, for a first message of a RACH procedure based at least in part on whether the UE has beam correspondence, at least one of: a set of time-frequency resources for the first message of the RACH procedure, or a preamble for the first message of the RACH procedure, as described above.

As shown in FIG. 12, in some aspects, the process may include transmitting, to a BS, the first message based at least in part on the selected at least one of the set of time-frequency resources or the preamble (block 1220). For example, the UE (for example, using controller/processor 280, transmit processor 264, TX MIMO processor 266, MOD 254, antenna 252, or the like) may transmit, to a BS, the first message based at least in part on the selected at least one of the set of time-frequency resources or the preamble, as described above.

The process may include additional aspects, such as any single aspect or any combination of aspects described below or in connection with one or more other processes described elsewhere herein.

In a first aspect, the UE may select the at least one of the set of time-frequency resources or the preamble for the first message based at least in part on an SSB index received from the BS.

In a second aspect, alone or in combination with the first aspect, the UE may select one or more of a first set of time-frequency resources for the first message based at least in part on the UE having beam correspondence, or may select one or more of a second set of time-frequency resources for the first message based at least in part on the UE not having beam correspondence.

In a third aspect, alone or in combination with one or more of the first and second aspects, the UE may select the preamble from a first set of preambles for the first message based at least in part on the UE having beam correspondence, or may select the preamble from a second set of preambles for the first message based at least in part on the UE not having beam correspondence.

In a fourth aspect, alone or in combination with one or more of the first through third aspects, the at least one of the set of time-frequency resources or the preamble indicates to the BS whether the UE has beam correspondence.

In a fifth aspect, alone or in combination with one or more of the first through fourth aspects, the UE may select the at least one of the set of time-frequency resources or the preamble based at least in part on preconfigured information stored by the UE.

In a sixth aspect, alone or in combination with one or more of the first through fifth aspects, the UE may select the at least one of the set of time-frequency resources or the preamble is based at least in part on an RMSI received from the BS.

In a seventh aspect, alone or in combination with one or more of the first through sixth aspects, the UE may select the at least one of the set of time-frequency resources or the preamble is based at least in part on PDCCH order received from the BS.

In an eighth aspect, alone or in combination with one or more of the first through seventh aspects, a reference signal associated with the PDCCH order is an SSB.

In a ninth aspect, alone or in combination with one or more of the first through eighth aspects, a reference signal associated with the PDCCH order is a CSI-RS.

In a tenth aspect, alone or in combination with one or more of the first through ninth aspects, the UE may select the at least one of the set of time-frequency resources or the preamble based at least in part on a MAC CE received from the BS.

In an eleventh aspect, alone or in combination with one or more of the first through tenth aspects, the UE may select the at least one of the set of time-frequency resources or the preamble based at least in part on: a PRACH configuration received from the BS, an SSB index received from the BS, an RS received from the BS, or information, determined by the UE, that identifies whether the UE has beam correspondence.

In a twelfth aspect, alone or in combination with one or more of the first through eleventh aspects, the UE may transmit the first message on a RACH occasion.

In a thirteenth aspect, alone or in combination with one or more of the first through twelfth aspects, the RACH occasion includes the set of time-frequency resources based at least in part on selecting the set of time-frequency resources.

In a fourteenth aspect, alone or in combination with one or more of the first through thirteenth aspects, the first message is associated with determining: an RA-RNTI, a RAPID, or whether the UE has beam correspondence.

Although FIG. 12 shows example blocks of the process, in some aspects, the process may include additional blocks, fewer blocks, different blocks, or differently arranged blocks than those depicted in FIG. 12. Additionally or alternatively, two or more of the blocks of the process may be performed in parallel.

Figure 13:
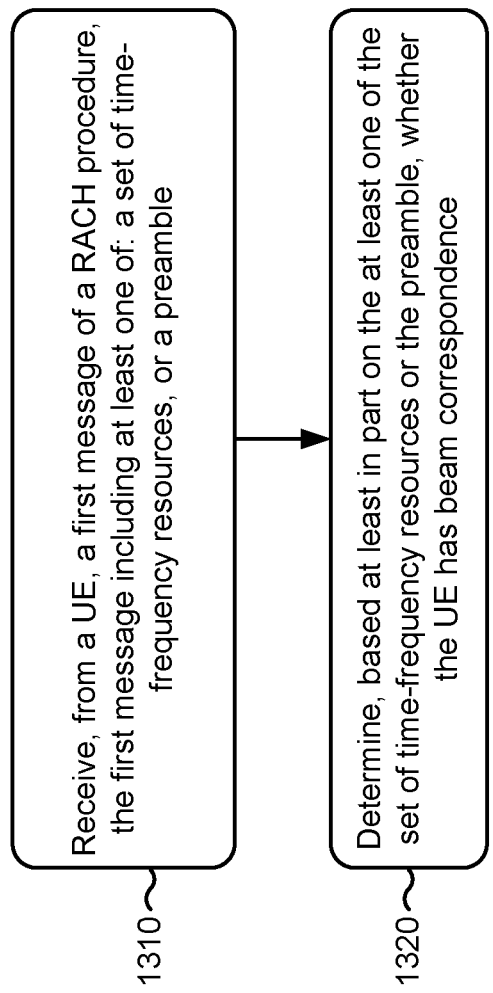
FIG. 13 is a diagram illustrating an example process performed by a BS in accordance with various aspects of the present disclosure.

FIG. 13 is a diagram illustrating an example process performed, for example, by a BS, in accordance with various aspects of the present disclosure. The process is an example where a BS (for example, BS 110) performs RACH message partitioning for beam correspondence indication.

As shown in FIG. 13, in some aspects, the process may include receiving, from a UE, a first message of a RACH procedure, the first message including at least one of a set of time-frequency resources, or a preamble (block 1310). For example, the BS (for example, using antenna 252, DEMOD 254, MIMO detector 256, receive processor 258, controller/processor 280, or the like) may receive, from a UE, a first message of a RACH procedure, as described above. In some aspects, the first message includes at least one of a set of time-frequency resources or a preamble.

As shown in FIG. 13, in some aspects, the process may include determining, based at least in part on the at least one of the set of time-frequency resources or the preamble, whether the UE has beam correspondence (block 1320). For example, the BS (for example, using controller/processor 240, or the like) may determine, based at least in part on the at least one of the set of time-frequency resources or the preamble, whether the UE has beam correspondence, as described above.

The process may include additional aspects, such as any single aspect or any combination of aspects described below or in connection with one or more other processes described elsewhere herein.

In a first aspect, the set of time-frequency resources or the preamble for the first message is based at least in part on an SSB index transmitted to the UE by the BS.

In a second aspect, alone or in combination with the first aspect, the BS may determine whether the UE has beam correspondence based at least in part on the set of time-frequency resources including one or more of a first set of time-frequency resources that indicates that the UE has beam correspondence, or may determine whether the UE has beam correspondence based at least in part on the set of time-frequency resources including one or more of a second set of time-frequency resources that indicates that the UE does not have beam correspondence.

In a third aspect, alone or in combination with one or more of the first and second aspects, the BS may determine whether the UE has beam correspondence based at least in part on the preamble being from a first set of preambles that indicates that the UE has beam correspondence, or may determine whether the UE has beam correspondence based at least in part on the preamble being from a second set of preambles that indicates that the UE does not have beam correspondence.

In a fourth aspect, alone or in combination with one or more of the first through third aspects, the BS may determine whether the UE has beam correspondence based at least in part on preconfigured information stored by the BS.

In a fifth aspect, alone or in combination with one or more of the first through fourth aspects, the BS may determine whether the UE has beam correspondence based at least in part on an RMSI transmitted by the BS.

In a sixth aspect, alone or in combination with one or more of the first through fifth aspects, the at least one of the set of time-frequency resources or the preamble are based at least in part on a PDCCH order transmitted by the BS.

In a seventh aspect, alone or in combination with one or more of the first through sixth aspects, a reference signal associated with the PDCCH order is an SSB.

In an eighth aspect, alone or in combination with one or more of the first through seventh aspects, a reference signal associated with the PDCCH order is a CSI-RS.

In a ninth aspect, alone or in combination with one or more of the first through eighth aspects, the set of time-frequency resources or the preamble is based at least in part on a MAC CE transmitted by the BS.

In a tenth aspect, alone or in combination with one or more of the first through ninth aspects, the at least one of the set of time-frequency resources or the preamble are based at least in part on: a PRACH configuration transmitted by the BS, an SSB index transmitted, an RS transmitted by the BS, or information, determined by the UE, that identifies whether the UE has beam correspondence.

In an eleventh aspect, alone or in combination with one or more of the first through tenth aspects, the BS may receive the first message on a RACH occasion.

In a twelfth aspect, alone or in combination with one or more of the first through eleventh aspects, the RACH occasion includes the set of time-frequency resources that indicates whether the UE has beam correspondence.

In a thirteenth aspect, alone or in combination with one or more of the first through twelfth aspects, the BS may determine, based at least in part on the first message and in association with determining whether the UE has beam correspondence, at least one of: an RA-RNTI, or a RAPID.

In a fourteenth aspect, alone or in combination with one or more of the first through thirteenth aspects, the BS may transmit, to the UE, a second message of the RACH procedure based at least in part on determining whether the UE has beam correspondence.

Although FIG. 13 shows example blocks of the process, in some aspects, the process may include additional blocks, fewer blocks, different blocks, or differently arranged blocks than those depicted in FIG. 13. Additionally or alternatively, two or more of the blocks of the process may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station (BS), at least one of a synchronization signal and physical broadcast channel (PBCH) block (SSB) index, remaining minimum system information (RMSI), a physical downlink control channel (PDCCH) order, or a media access control (MAC) control element (MAC CE);
   selecting, for a first message of a random access channel (RACH) procedure, based at least in part on the at least one of the SSB index, the RMSI, the PDCCH order, or the MAC CE, at least one of a super set of time-frequency resources or a set of preambles;
   selecting, for the first message of the RACH procedure, based at least in part on whether the UE has beam correspondence, at least one of a set of time-frequency resources from the super set of time-frequency resources, or a preamble from the set of preambles; and
   transmitting, to the BS, the first message based at least in part on the selected at least one of the set of time-frequency resources or the preamble, the at least one of the set of time-frequency resources or the preamble indicating to the BS whether the UE has beam correspondence.

2. The method of claim 1, wherein selecting the set of time-frequency resources from the super set of time-frequency resources comprises:
   selecting the set of time-frequency resources from a first set of time-frequency resources of the super set of time-frequency resources based at least in part on the UE having beam correspondence, or selecting the set of time-frequency resources from a second set of time-frequency resources of the super set of time-frequency resources based at least in part on the UE not having beam correspondence.

3. The method of claim 1, wherein selecting the preamble from the set of preambles comprises:
selecting the preamble from a first set of preambles of the set of preambles based at least in part on the UE having beam correspondence, or
selecting the preamble from a second set of preambles of the set of preambles based at least in part on the UE not having beam correspondence.

4. The method of claim 1, wherein a reference signal associated with the PDCCH order is a synchronization signal block (SSB).

5. The method of claim 1, wherein a reference signal associated with the PDCCH order is a channel state information reference signal (CSI-RS).

6. The method of claim 1, wherein transmitting the first message of the RACH procedure comprises transmitting the first message on a RACH occasion that includes the set of time-frequency resources.

7. The method of claim 1, wherein the first message is usable to determine at least one of a random access radio network temporary identifier (RA-RNTI) or a random access preamble identifier (RAPID).

8. A method of wireless communication performed by a base station (BS), comprising:
transmitting, to at least one user equipment (UE), at least one of a synchronization signal and physical broadcast channel (PBCH) block (SSB) index, remaining minimum system information (RMSI), a physical downlink control channel (PDCCH) order, or a media access control (MAC) control element (MAC CE), the at least one of the SSB index, the RMSI, the PDCCH order, or the MAC CE, indicating at least one of a super set of time-frequency resources or a set of preambles for a first message of a random access channel (RACH) procedure, wherein:
the super set of time-frequency resources includes at least a first set of time-frequency resources for the at least one UE to use for the first message of the RACH procedure based at least in part on the UE having beam correspondence and a second set of time-frequency resources for the at least one UE to use for the first message of the RACH procedure based at least in part on the UE not having beam correspondence, or
the set of preambles includes at least a first set of preambles for the at least one UE to use for the first message of the RACH procedure based at least in part on the UE having beam correspondence and a second set of preambles for the at least one UE to use for the first message of the RACH procedure based at least in part on the UE not having beam correspondence;
receiving, from the at least one UE, the first message of the RACH procedure, the first message of the RACH procedure being received on a selected set of time-frequency resources from the super set of time-frequency resources or including a selected preamble from the set of preambles, the selected set of time-frequency resources or the selected preamble indicating to the BS whether the UE has beam correspondence;
determining, based at least in part on the the selected set of time-frequency resources or the selected preamble, whether the UE has beam correspondence; and
transmitting, to the at least one UE, a second message of the RACH procedure based at least in part on whether the UE has beam correspondence.

9. The method of claim 8, wherein a reference signal associated with the PDCCH order is a synchronization signal block (SSB).

10. The method of claim 8, wherein a reference signal associated with the PDCCH order is a channel state information reference signal (CSI-RS).

11. The method of claim 8, wherein receiving the first message of the RACH procedure comprises receiving the first message on a RACH occasion that includes the selected set of time-frequency resources.

12. The method of claim 8, further comprising determining, based at least in part on the first message and in association with determining whether the UE has beam correspondence, at least one of a random access radio network temporary identifier or a random access preamble identifier.

13. A user equipment (UE) for wireless communication, comprising:
a memory; and
one or more processors operatively coupled to the memory, the memory and the one or more processors configured to:
receive, from a base station (BS), at least one of a synchronization signal and physical broadcast channel (PBCH) block (SSB) index, remaining minimum system information (RMSI), a physical downlink control channel (PDCCH) order, or a media access control (MAC) control element (MAC CE);
select, for a first message of a random access channel (RACH) procedure, based at least in part on the at least one of the SSB index, the RMSI, the PDCCH order, or the MAC CE, at least one of a super set of time-frequency resources or a set of preambles;
select, for the first message of the RACH procedure, based at least in part on whether the UE has beam correspondence, at least one of a set of time-frequency resources from the super set of time-frequency resources, or a preamble from the set of preambles; and
transmit, to the BS, the first message based at least in part on the selected at least one of the set of time-frequency resources or the preamble, the at least one of the set of time-frequency resources or the preamble indicating to the BS whether the UE has beam correspondence.

14. The UE of claim 13, wherein the one or more processors, when selecting the set of time-frequency resources from the super set of time-frequency resources, are configured to:
select the set of time-frequency resources from a first set of time-frequency resources of the super set of time-frequency resources based at least in part on the UE having beam correspondence, or
select the set of time-frequency resources from a second set of time-frequency resources of the super set of time-frequency resources based at least in part on the UE not having beam correspondence.

15. The UE of claim 13, wherein the one or more processors, when selecting the preamble from the set of preambles, are configured to:
select the preamble from a first set of preambles of the set of preambles based at least in part on the UE having beam correspondence, or select the preamble from a second set of preambles of the set of preambles based at least in part on the UE not having beam correspondence.

16. A base station (BS) for wireless communication, comprising:
a memory; and
one or more processors operatively coupled to the memory, the memory and the one or more processors configured to:
    transmit, to at least one user equipment (UE), at least one of a synchronization signal and physical broadcast channel (PBCH) block (SSB) index, remaining minimum system information (RMSI), a physical downlink control channel (PDCCH) order, or a media access control (MAC) control element (MAC CE), the at least one of the SSB index, the RMSI, the PDCCH order, or the MAC CE, indicating at least one of a super set of time-frequency resources or a set of preambles for a first message of a random access channel (RACH) procedure, wherein:
        the super set of time-frequency resources includes at least a first set of time-frequency resources for the at least one UE to use for the first message of the RACH procedure based at least in part on the UE having beam correspondence and a second set of time-frequency resources for the at least one UE to use for the first message of the RACH procedure based at least in part on the UE not having beam correspondence, or
        the set of preambles includes at least a first set of preambles for the at least one UE to use for the first message of the RACH procedure based at least in part on the UE having beam correspondence and a second set of preambles for the at least one UE to use for the first message of the RACH procedure based at least in part on the UE not having beam correspondence;
    receive, from the at least one UE, the first message of the RACH procedure, the first message of the RACH procedure being received on a selected set of time-frequency resources from the super set of time-frequency resources or including a selected preamble from the set of preambles, the selected set of time-frequency resources or the selected preamble indicating to the BS whether the UE has beam correspondence;
    determine, based at least in part on the selected set of time-frequency resources or the selected preamble, whether the UE has beam correspondence; and
    transmit, to the at least one UE, a second message of the RACH procedure based at least in part on whether the UE has beam correspondence.

* * * * *